United States Patent
Sugihara

(10) Patent No.: US 7,665,433 B2
(45) Date of Patent: Feb. 23, 2010

(54) METHOD FOR CONTROLLING ACTUATION OF VALVES IN ENGINE WITH TURBOCHARGER

(75) Inventor: Hiroyuki Sugihara, Hino (JP)

(73) Assignee: Hino Motors, Ltd., Tokyo (JP)

( * ) Notice: Subject to any disclaimer, the term of this patent is extended or adjusted under 35 U.S.C. 154(b) by 356 days.

(21) Appl. No.: 11/816,478
(22) PCT Filed: Feb. 22, 2006
(86) PCT No.: PCT/JP2006/303136

§ 371 (c)(1),
(2), (4) Date: Aug. 16, 2007

(87) PCT Pub. No.: WO2006/090726
PCT Pub. Date: Aug. 31, 2006

(65) Prior Publication Data
US 2009/0071423 A1 Mar. 19, 2009

(30) Foreign Application Priority Data
Feb. 23, 2005 (JP) .............................. 2005-046658

(51) Int. Cl.
*F01L 1/34* (2006.01)
(52) U.S. Cl. ................. 123/90.15; 123/90.17; 123/347; 123/559.2
(58) Field of Classification Search ............. 123/90.15, 123/90.17, 345, 346, 347, 348, 559.1, 559.2, 123/90.16, 90.18; 60/598, 600, 611
See application file for complete search history.

(56) References Cited

U.S. PATENT DOCUMENTS
6,647,723 B1 * 11/2003 Sun et al. ...................... 60/601

FOREIGN PATENT DOCUMENTS

| JP | 55 164739 | 12/1980 |
|---|---|---|
| JP | 63 38622 | 2/1988 |
| JP | 2 248624 | 10/1990 |
| JP | 9 505654 | 6/1997 |
| JP | 11 141375 | 5/1999 |
| JP | 2004 137932 | 5/2004 |
| JP | 2004 360577 | 12/2004 |

* cited by examiner

*Primary Examiner*—Ching Chang
(74) *Attorney, Agent, or Firm*—Oblon, Spivak, McClelland, Maier & Neustadt, L.L.P.

(57) ABSTRACT

Surging is reliably prevented from occurring even when an engine with a turbocharger is operated with reduced number of cylinders and at a low speed range.

Concerned is a method for controlling actuation of valves in an engine with a turbocharger, a variable valve mechanism 18 being arranged for controlling opening/closing timing and lifts of suction and exhaust valves (only exhaust valves 17 being shown in the figure) of each of cylinders 8, an operation with reduced number of cylinders being made possible by the variable valve mechanism 18 such that valve-opening action of suction and exhaust valves in part of the cylinders 8 is disabled to conduct the operation with the remaining cylinders 8. The exhaust valves 17 are opened substantially when a suction pressure is higher than an exhaust pressure in a suction stroke during the operation with the reduced number of cylinders at a low speed range, so that blown out amount of fresh air (suction air 4) to the exhaust side is increased to increase apparent exhaust flow rate and raise the level of the suction characteristic of the engine.

1 Claim, 4 Drawing Sheets

METHOD FOR CONTROLLING ACTUATION OF VALVES IN ENGINE WITH TURBOCHARGER

TECHNICAL FIELD

The present invention relates to a method for controlling actuation of valves in an engine with a turbocharger capable of conducting an operation with reduced number of cylinders through a variable valve mechanism.

BACKGROUND ART

Generally, an engine for an automobile or the like is designed such that fuel consumption rate is best in an operation with load percentage of about 70-80% and at revolution speed of about 40-60% to maximum. It turns out therefore that, in a normal running, the engine is operated at an inferior fuel consumption rate with load lower than design value.

Conventionally proposed countermeasure thereto is an operation with reduced number of cylinders where the number of cylinders ignited in an engine is reduced depending upon output required; the engine is driven only with the reduced number of cylinders and with enhanced load condition so as to improve the fuel consumption rate and the like.

As a countermeasure to a nowadays problem that exhaust purifying catalyst incorporated in an exhaust pipe hardly attains its active temperature during low load running, an operation with reduced number of cylinders during the low load condition has been proposed so as to keep the exhaust temperature at higher level.

This kind of operation with reduced number of cylinders has been disclosed, for example, in the following References 1 and 2.

[Reference 1] JP 2004-137932A
[Reference 2] JP 2004-360577A

SUMMARY OF THE INVENTION

Problems to be Solved by the Invention

Though not specifically raised in these References 1 and 2, adoption of an operation with reduced number of cylinders to an engine with a turbocharger may bring about significant deterioration in suction characteristic of the engine due to rapidly lowered exhaust flow rate during the operation with reduced number of cylinders, leading to turning of engine resistance curve toward smaller air amount side in compressor performance curves. As a result, the turbocharger suited for a normal operation with full number of cylinders tends to cause surging (which is a phenomenon that discharge pressure and intake air amount of a compressor are greatly pulsated to bring about vibrations and/or abnormal sounds when a relationship between the pressure and the air amount enters into a surging region; when a compressor is rotated at a predetermined revolution speed, surging may occur provided that the flow rate is lowered below a predetermined lower limit or the discharge pressure exceeds a predetermined upper limit). Especially during a high load operation at a low speed range (for example, on the order of 1000 rpm), there is a fair possibility that the compressor tends to cause surging, resulting in failure of operation or lowering in performance.

The invention was made in view of the above and has its object to reliably prevent the surging from occurring even when an engine with a turbocharger is operated with reduced number of cylinders and at a low speed range.

Means or Measures for Solving the Problems

The invention is directed to a method for controlling actuation of valves in an engine with a turbocharger, a variable valve mechanism being arranged for controlling opening/closing timing and lifts of suction and exhaust valves in each of cylinders, an operation with reduced number of cylinders being made possible by said variable valve mechanism such that valve-opening action of the suction and exhaust valves in part of the cylinders may be disabled to conduct the operation with the remaining cylinders, characterized in that the exhaust valves are opened substantially when a suction pressure is higher than an exhaust pressure in a suction stroke during the operation with the reduced number of cylinders at a low speed range.

Thus, when the operation of the engine at low speed range is changed over from that with full number of cylinders to that with reduced number of cylinders and even if the relationship between a discharge pressure and an intake air amount in the compressor of the turbocharger approaches a surging region, the exhaust valves are opened substantially when the suction pressure is higher than the exhaust pressure in the suction stroke, so that part of fresh air taken through the suction valves into the cylinders is blown out as it is via the exhaust valves to the exhaust side, whereby apparent exhaust flow rate is increased by the blown-out fresh air amount to raise the level of the suction characteristic of the engine. As a result, the intake air amount in the compressor is increased and blown-out air amount from suction side to exhaust side is increased to lower the discharge pressure in the compressor, so that engine resistance curve in compressor performance curves turns toward larger air amount side, and compressor operating status is distanced away from the surging region.

EFFECTS OF THE INVENTION

According to a method for controlling actuation of valves in an engine with a turbocharger of the invention as mentioned above, the following excellent features and advantages can be obtained. The engine with the turbocharger can be operated with reduced number of cylinders at a low speed region while surging is reliably prevented from occurring, so that the turbocharger can be preliminarily prevented from failing in operation or being deteriorated in performance due to surging, and thus the engine with the turbocharger can attain the operation with reduced number of cylinders with no problems.

EXPLANATION OF THE REFERENCE NUMERALS

Figure 1:
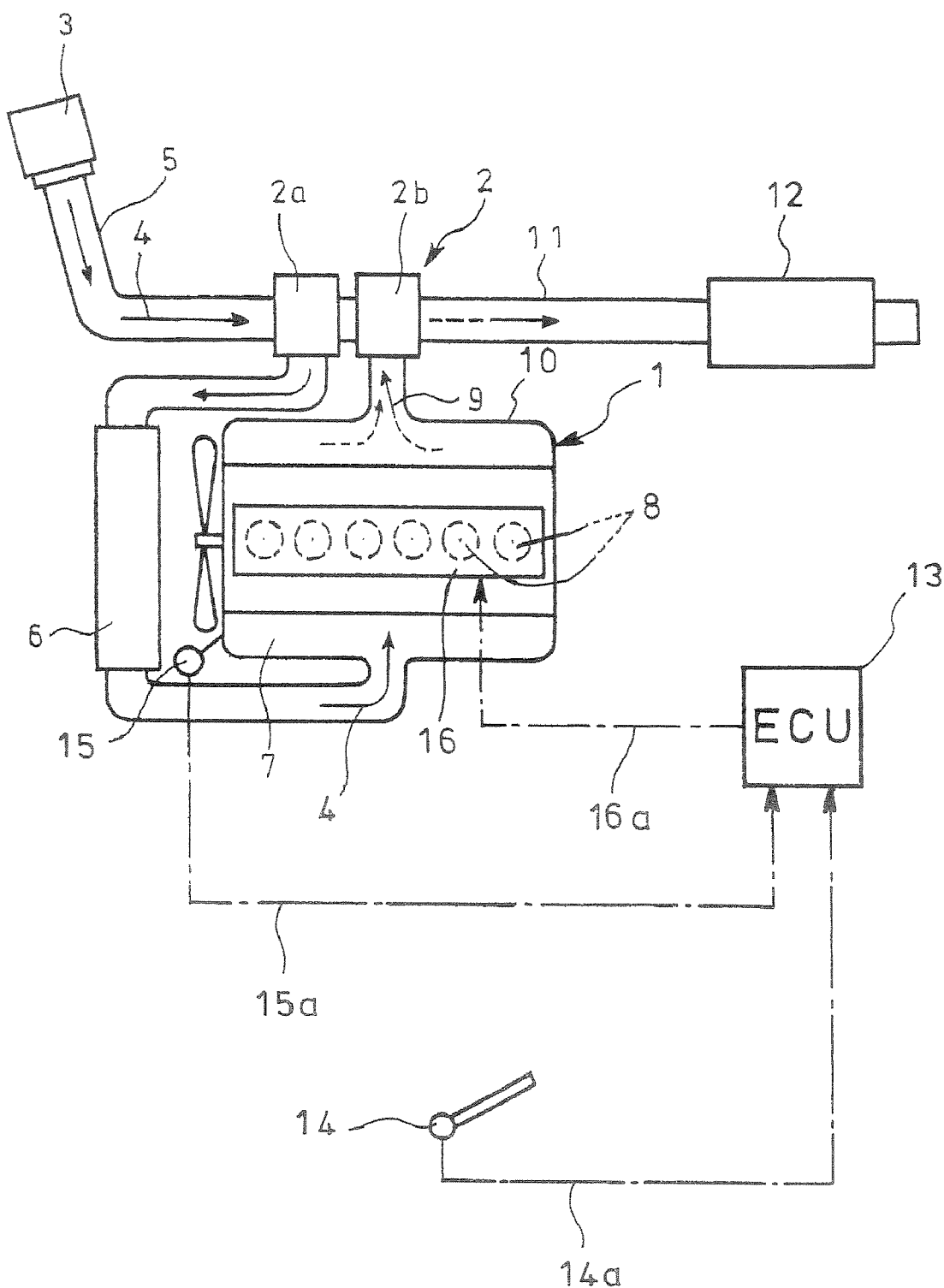
FIG. 1 is a schematic view showing an embodiment of the invention.

1 engine
2 turbocharger
2a compressor 2b turbine
4 suction air (fresh air)
8 cylinder
9 exhaust gas
13 controller
17 valve
18 variable valve mechanism
32 sub-lift

BEST MODE FOR CARRYING OUT THE
INVENTION

An embodiment of the invention will be described in conjunction with drawings.

FIGS. 1-4 show the embodiment of the invention. In FIG. 1, reference numeral 1 denotes an engine with a turbocharger 2 which in turn has a compressor 2a to which suction air 4 from an air cleaner 3 is fed via an suction air pipe 5. The air 4 thus pressurized in the compressor 2a is fed to an intercooler 6 for cooling. The air 4 thus cooled is fed from the intercooler 6 to a suction manifold 7 for distribution to respective cylinders 8 of the engine 1.

Exhaust gas 9 discharged from the respective cylinders 8 of the engine 1 is fed via an exhaust manifold 10 to a turbine 2b of the turbocharger 2. The exhaust gas 9 after having driven the turbine 2b is discharged outside of a vehicle via an exhaust pipe 11 and a muffler 12.

Inputted to a controller 13 (control means) in the form of an engine control computer (ECU: electronic control unit) are an accelerator stepped-in degree signal 14a from an accelerator sensor 14 (load sensor) which detects stepped-in degree of an accelerator (not shown) as load for the engine 1 as well as a revolution speed signal 15a from a revolution sensor 15 which detects revolution speed of the engine 1. Outputted on the basis of these signals 14a and 15a is a fuel injection signal 16a for command of fuel injection timing and injection amount directed to a fuel injection device 16 which injects fuel to the respective cylinders 8.

The fuel injection device 16 comprises a plurality of injectors (not shown) each for each cylinder 8. An electromagnetic valve of each of the injectors is properly controlled to be opened by a fuel injection signal 16a from the controller 13 so as to properly control injection timing and injection amount (valve-opening time period) of the fuel.

In the embodiment, the fuel injection signal 16a for normal mode is determined in the controller 13 on the basis of the accelerator stepped-in degree and revolution speed signals 14a and 15a. When the engine 1 is judged to be in a predetermined operation range on the basis of the signals 14a and 15a, the operation of the engine is changed over from a normal mode to a mode with reduced number of cylinders. Upon changeover into such mode with the reduced number of cylinders, the fuel injection signal 16a (fuel injection command) is outputted so as to cut out fuel injection of part of the cylinders 8.

Figure 2:
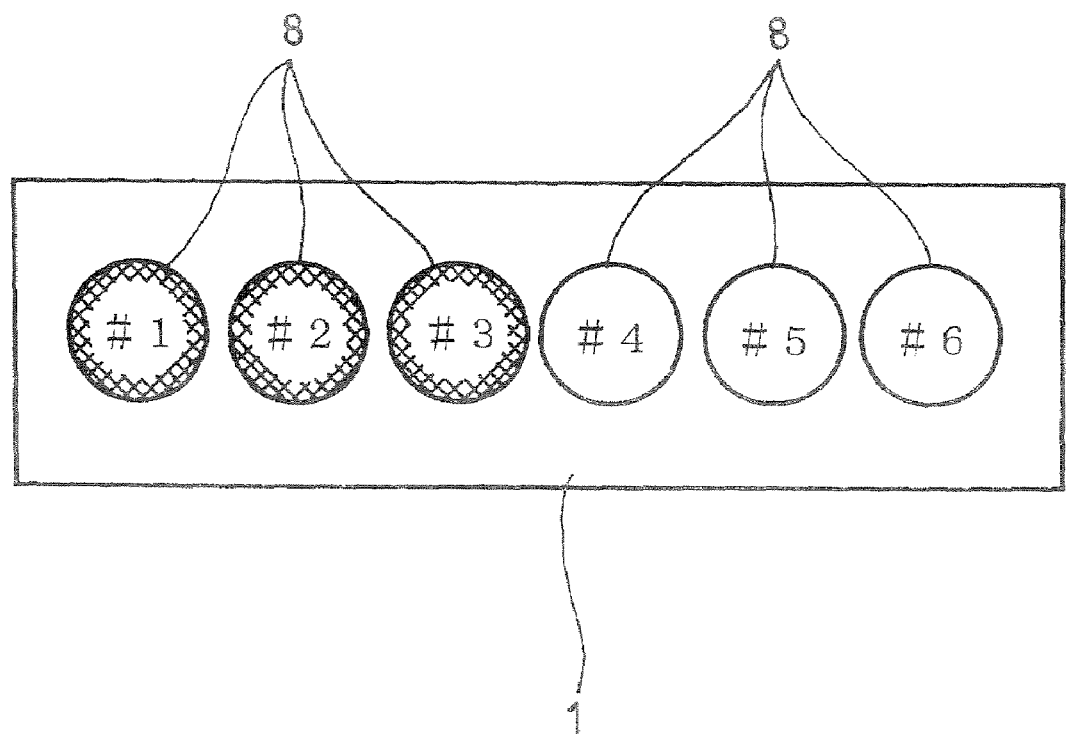
FIG. 2 is a pattern diagram for explanation of an operation with reduced number of cylinders in the engine shown in FIG. 1.

For example, when the illustrated engine 1 is an inline six-cylinder engine comprising six cylinders 8 as shown by #1-#6 in FIG. 2 and ignition sequence is in the order of #1→#4→#2→#6→#3→#5, then the cylinders 8 may be grouped into a group of #1, #2 and #3 cylinders 8 and that of #4, #5 and #6 cylinders 8 to cut out fuel injection of one of the groups (for example, #1, #2 and #3 cylinders 8) so as to conduct combustion at uniform time interval even after fuel injection of half of the cylinders is cut out.

Figure 3:
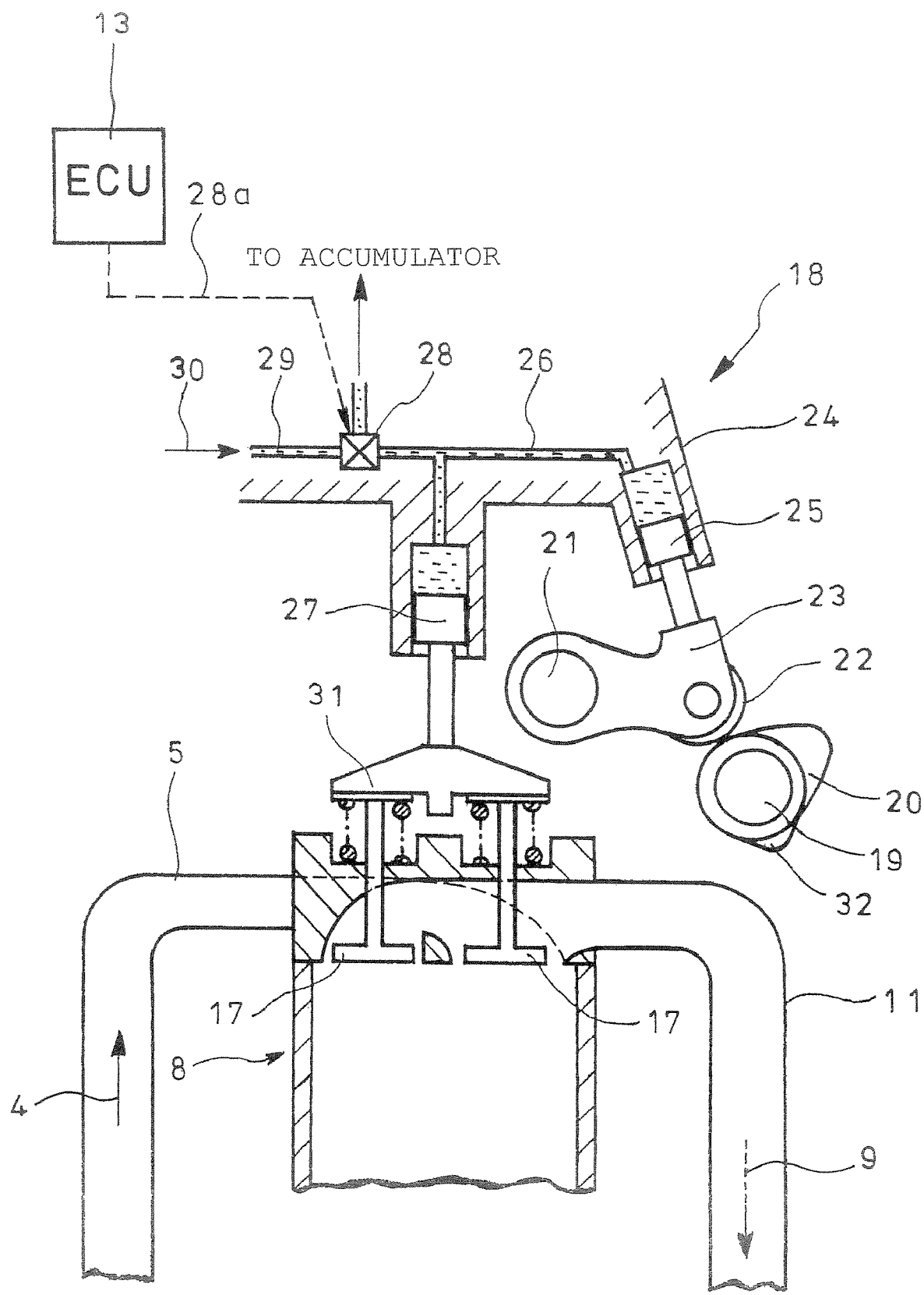
FIG. 3 is a schematic view showing an embodiment of a variable valve mechanism used for the engine shown in FIG. 1.

In the engine 1 of the embodiment, in order to attain optimum heat efficiency in accordance with a revolution speed of the engine to improve fuel consumption and the like, a variable valve mechanism 18 is adapted which can vary opening/closing timing and lifts of valves 17 as shown in FIG. 3 (exhaust valves are shown in the figure). In the above-mentioned mode with reduced number of cylinders and with respect to the group of cylinders 8 (for example, #1, #2 and #3 cylinders 8) with their fuel injection being cut out, the variable valve mechanism 18 is utilized also as valve action disablement means for disabling valve-opening action of the valves 17 only during the mode with reduced number of cylinders.

More specifically, FIG. 3 shows an embodiment of a hydraulic variable valve mechanism 18 which comprises a cam shaft 19 extending in a direction of arrangement of the cylinders 8, suction and exhaust cams 20 each corresponding to each cylinder 8 (the exhaust cam is shown in the figure) and arranged on the cam shaft 19, and a rocker shaft 21 extending adjacent to and in parallel with the cam shaft 19 and having rocker arms 23 each pivotable through pushing at its one end by the corresponding cam 20 via a roller 22.

The end of the rocker arm 23 pushes up a master piston 25 in an upper hydraulic unit 24 to generate hydraulic pressure in a valve-opening oil passage 26 in the hydraulic unit 24, so that a slave piston 27 just above a bridge 31 is lowered to push down both the valves via the bridge 31 to open the valves.

The valve-opening oil passage 26 in the hydraulic unit 24 is connected to an oil feed passage 29 via a three-way solenoid valve 28 (hydraulic supply means) for changeover of holding/releasing of the hydraulic pressure in the oil passage 26. Working fluid 30 fed by an oil pump (not shown) driven by the engine is guided to the valve-opening oil passage 26 to fill the same, so that upon actuation of the master piston 25, holding/releasing of the hydraulic pressure in the oil passage 26 is properly changed over on the basis of a control signal 28a from the controller 13 to control the follow-up timing and working amount of the slave piston 27 to thereby adjust the opening/closing timing and lifts of the valves 17.

More specifically, if the hydraulic pressure of the valve-opening oil passage 26 would be held or retained by the solenoid valve 28 upon activation of the master piston 25, the slave piston 27 would instantly follow the actuation of the master piston 25 and would be activated; however, when the hydraulic pressure in the oil passage 26 generated by the actuation of the master piston 25 is released to an accumulator or the like through changeover of the solenoid valve 28, then the slave piston 27 does not follow the actuated master piston 25, so that the following-up timing may be delayed and/or the working amount may be reduced; eventually, the valve-opening action of the valves 17 may be utterly disabled.

Thus, with respect to the group of cylinders 8 (for example, #1, #2 and #3 cylinders 8) with their fuel injection being cut out in the above-mentioned mode with reduced number of cylinders and when the variable valve mechanism 18 is to be utilized as valve movement disablement means for disabling the valve-opening action of the valves 17 only during the mode with the reduced number of cylinders, it may suffice that, upon changeover of the control by the controller 13 from the normal mode to the mode with reduced number of cylinders, the controller 13 outputs the control signal 28a as disablement command to the solenoid valves 28 of the variable valve mechanism 18 to keep the solenoid valves 28 in a state of releasing hydraulic pressure to the accumulator or the like.

Then, in the embodiment and with respect to the above-mentioned engine 1 capable of conducting an operation with reduced number of cylinders, in the cylinders 8 (for example, #4, #5 and #6 cylinders 8) acting continuously in the operation with reduced number of cylinders at a low speed range, the exhaust valves 17 are opened with lifts smaller than that upon normal valve-opening action substantially when the suction pressure is higher than the exhaust pressure in the suction stroke.

Figure 4:
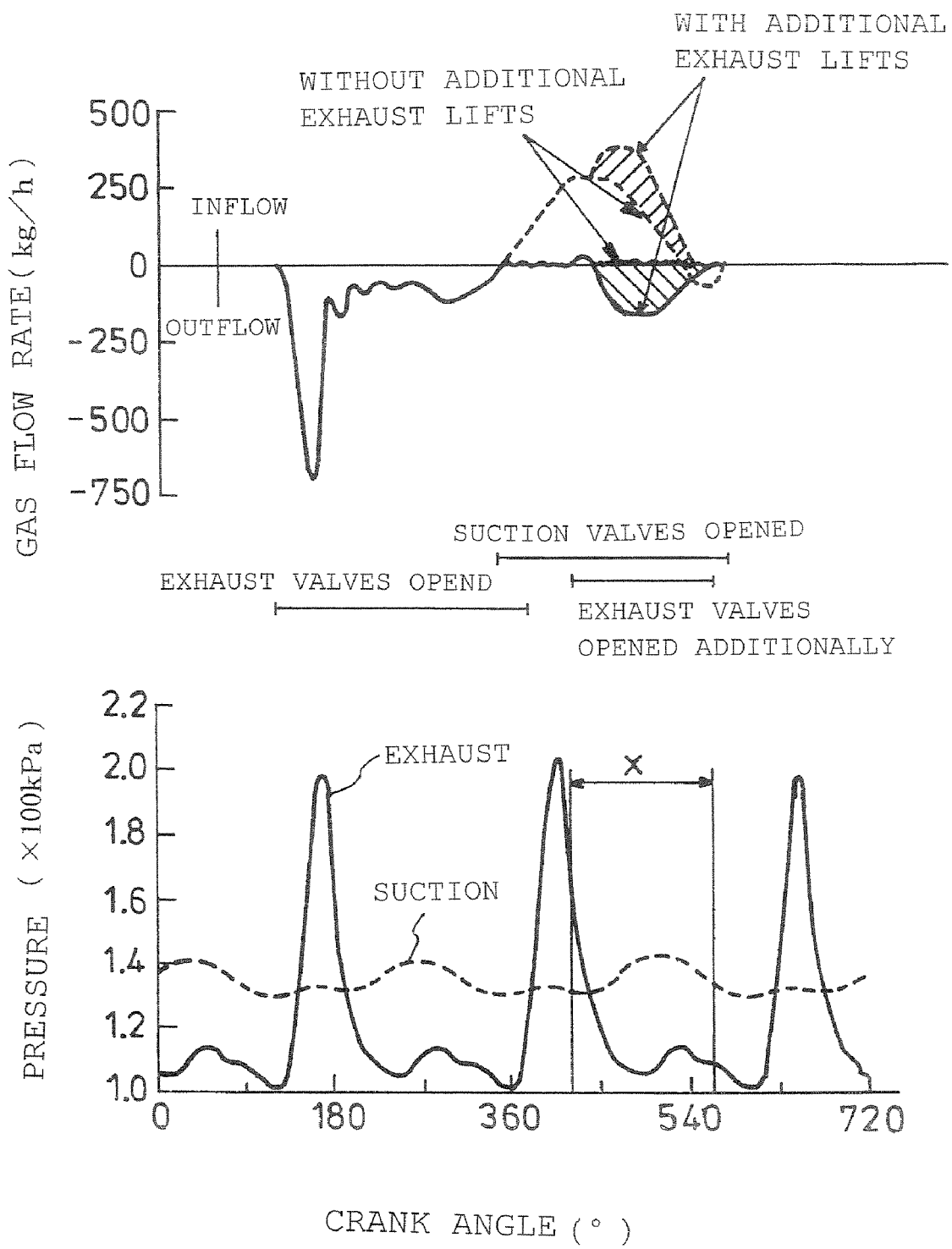
FIG. 4 shows graphs for explanation of fresh air blown out from suction side to exhaust side.

More specifically, as shown in the lower graph in FIG. 4, exhaust has great pulsations in a low speed range and there does exist a period during the suction valves being opened that exhaust pressure (pressure in the exhaust manifold 10) is lower than the suction pressure (pressure in the suction manifold 7). Thus, such period is aimed at; the exhaust valves (exhaust valves 17) are opened in a period x shown in the lower graph in FIG. 4 to blow out part of the fresh air (suction air 4) to the exhaust side. In this respect, this period x includes more or less a portion where the exhaust pressure is higher than the suction pressure, which causes, however, no specific troubles in blowing out the part of the fresh air to the exhaust side, provided that the exhaust pressure is lower than the suction pressure in a majority of the period x where the exhaust valves are opened.

In fact, when exhaust lifts are added in the period x during the suction stroke, as hatched in the upper graph in FIG. 4 (negative flow rate indicates outflow from cylinder and positive flow rate, inflow into cylinder; solid line shows gas flow rate through exhaust valves and dotted line, gas flow rate through suction valves), it is confirmed that flow rate of inflow gas passing via the suction valves into cylinder is increased than usual and flow rate of outflow gas passing via the exhaust valve to outside of cylinder is increased; that is, part of the fresh air taken into cylinder via the suction valves is blown out as it is through the exhaust valves to the exhaust side.

Here, specific means for opening the exhaust valves 17 during the suction stroke will be explained with respect to FIG. 3. The exhaust cam 20 shown is formed with a sub-lift 32 (additional small cam projection) which makes it possible to open the exhaust valves 17 during the suction stroke. In the normal valve-opening action, the hydraulic pressure due to the sub-lift 32 is instantly released by the solenoid valve 28 so as not to conduct the valve-opening action of the exhaust valves 17 during the suction stroke; however, during the operation with reduced number of cylinders at a low speed range, the hydraulic pressure due to the sub-lift 32 is held by the solenoid valve 28 on the basis of the control signal 28a from the controller 13, so that the exhaust valves 17 are opened with relatively small lifts irrespective of the suction stroke.

Thus, upon changeover from the normal mode to the mode with reduced number of cylinders in the controller 13, the solenoid valve 28 in the variable valve mechanism 18 receives the control signal 28a as disablement command from the controller 13 and is held in the status of releasing hydraulic pressure to an accumulator or the like, so that the slave piston 27 does not follow the activated master piston 25. As a result, valve-opening action of the valves 17 in part of the cylinders 8 (for example, #1, #2 and #3 cylinders 8) is disabled; moreover, fuel injection of the cylinder 8 (for example, #1, #2 and #3 cylinders 8) with disabled valve-opening action of the valves 17 is cut out by the fuel injection signal 16a from the controller 13 to the fuel injection device 16, so that the part of the cylinders 8 (for example, #1, #2 and #3 cylinders 8) becomes utterly disabled and the operation with reduced number of cylinders is conducted only by the remaining cylinders 8 (for example, #4, #5 and #6 cylinders 8).

In this respect, rapidly lowered exhaust flow rate significantly lowers the suction characteristic of the engine 1, so that, at the low speed range, the relationship between the discharge pressure and the intake air amount in the compressor 2a of the turbocharger 2 may approach a surging region. However, on the basis of the control signal 28a from the controller 13, the hydraulic pressure due to the sub-lifts 32 is held by the solenoid valves 28 in the variable valve mechanism 18 corresponding to the continuously operating cylinders 8 (for example, #4, #5 and #6 cylinders 8), so that suction valves 17 are opened in the period x (see the lower graph in FIG. 4) where the suction pressure is higher than the exhaust pressure during the suction stroke. Thus, part of the fresh air (suction air 4) taken into the cylinders 8 through the suction valves 17 is blown out as it is via the exhaust valves 17 to the exhaust side; the apparent exhaust flow rate is increased by the blown-out fresh air amount to raise the level of the suction characteristic of the engine 1.

Thus, the intake air amount in the compressor 2a is increased and the blown out amount from the suction side to the exhaust side is increased, so that discharge pressure in the compressor 2a is lowered. As a result, resistance curve of the engine 1 in the compressor performance curves turns toward larger air amount side and the operational state of the compressor 2a is distanced away from the surging region.

In the disabled cylinders (for example, #1, #2 and #3 cylinders 8), the valves 17 are held in closed state and air is trapped inside; however, such air is only expanded/compressed in the cylinders 8 and does not serve to lower the output (since resistance during compression is balanced out upon expansion); rather, any resistance due to inflow/outflow of air is prevented from being generated which would be caused when the valve-opening action of the valves 17 were continued (i.e., when only fuel injection were cut out).

Thus, according to the above embodiment, even when an engine 1 with a turbocharger 2 is operated with reduced number of cylinders at a low speed range, surging can be reliably prevented. As a result, the turbocharger 2 can be preliminarily prevented from failing in operation or being deteriorated in performances due to surging, and thus the engine 1 with the turbocharger 2 can attain an operation with reduced number of cylinders with no troubles.

It is to be understood that a method for controlling actuation of valves in an engine with a turbocharger according to the invention is not limited to the above embodiment and that various changes and modifications may be made without departing from the scope of the invention. For example, any variable valve mechanism other than shown may be used.

The invention claimed is:

1. A method for controlling actuation of valves in an engine with a turbocharger, a variable valve mechanism being arranged for controlling opening/closing timing and lifts of suction and exhaust valves in each of cylinders, an operation with reduced number of cylinders being made possible by said variable valve mechanism such that valve-opening action of the suction and exhaust valves in part of the cylinders may be disabled to conduct the operation with the remaining cylinders, characterized in that the exhaust valves are opened substantially when a suction pressure is higher than an exhaust pressure in a suction stroke during the operation with the reduced number of cylinders at a low speed range.

* * * * *